US012626963B2

(12) United States Patent
Yoshida et al.

(10) Patent No.: US 12,626,963 B2
(45) Date of Patent: May 12, 2026

(54) POWER STORAGE CELL

(71) Applicant: PRIME PLANET ENERGY & SOLUTIONS, INC., Tokyo (JP)

(72) Inventors: Naotake Yoshida, Himeji (JP); Yusuke Fujii, Kasai (JP); Mitsutoshi Tajima, Kobe (JP); Wataru Okada, Kobe (JP); Satoru Matsuyama, Kasai (JP); Kensaku Fukumoto, Kato (JP); Junya Yano, Kato (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 982 days.

(21) Appl. No.: 17/681,258

(22) Filed: Feb. 25, 2022

(65) Prior Publication Data

US 2022/0294041 A1      Sep. 15, 2022

(30) Foreign Application Priority Data

Mar. 11, 2021      (JP) ................................. 2021-039304

(51) Int. Cl.
| | |
|---|---|
| *H01M 50/103* | (2021.01) |
| *H01M 10/42* | (2006.01) |
| *H01M 10/48* | (2006.01) |
| *H01M 50/15* | (2021.01) |
| *H01Q 1/22* | (2006.01) |

(52) U.S. Cl.
CPC ..... *H01M 10/486* (2013.01); *H01M 10/4257* (2013.01); *H01Q 1/22* (2013.01); *H01M 2010/4271* (2013.01); *H01M 2010/4278* (2013.01); *H01M 50/103* (2021.01); *H01M 50/15* (2021.01)

(58) Field of Classification Search
CPC ..... H01M 10/4257; H01M 2010/4271; H01M 10/482; H01M 10/425; H01M 50/147; H01M 10/48
See application file for complete search history.

(56) References Cited

U.S. PATENT DOCUMENTS

| | | |
|---|---|---|
| 2011/0080138 A1 | 4/2011 | Nakanishi |
| 2011/0210700 A1 | 9/2011 | Shimizu |
| 2011/0316520 A1 | 12/2011 | Kawahara et al. |
| 2013/0149578 A1 | 6/2013 | Uchida |
| 2013/0234721 A1 | 9/2013 | Nakamura et al. |

(Continued)

FOREIGN PATENT DOCUMENTS

| | | |
|---|---|---|
| CA | 3 071 122 A1 | 1/2019 |
| CN | 103201889 A | 7/2013 |

(Continued)

OTHER PUBLICATIONS

Foreign Reference Translation for DE-102011088440-A1 (Year: 2013).*

*Primary Examiner* — Carlos Barcena
(74) *Attorney, Agent, or Firm* — Finnegan, Henderson, Farabow, Garrett and Dunner, LLP

(57) ABSTRACT

An exterior package, a main body portion, and a detection unit are provided. The main body portion is disposed inside the exterior package. The detection unit detects a state of a power storage cell and performs wireless communication, at least a portion of the detection unit being disposed inside the exterior package.

9 Claims, 8 Drawing Sheets

(56) References Cited

U.S. PATENT DOCUMENTS

| | | | |
|---|---|---|---|
| 2014/0068288 A1* | 3/2014 | Robinson | H02J 9/005 |
| | | | 713/320 |
| 2014/0312913 A1 | 10/2014 | Kikuchi et al. | |
| 2014/0354291 A1 | 12/2014 | Kikuchi et al. | |
| 2014/0364057 A1 | 12/2014 | Schumann et al. | |
| 2015/0243943 A1 | 8/2015 | Masuda | |
| 2016/0247389 A1 | 8/2016 | Shimizu et al. | |
| 2017/0351561 A1 | 12/2017 | Yamazoe et al. | |
| 2017/0365884 A1 | 12/2017 | Ihara et al. | |
| 2018/0134168 A1 | 5/2018 | Keller et al. | |
| 2019/0237816 A1 | 8/2019 | Kim et al. | |
| 2020/0014075 A1 | 1/2020 | Tabatowski-Bush et al. | |
| 2020/0021119 A1 | 1/2020 | Kim | |
| 2020/0058980 A1 | 2/2020 | Wang et al. | |
| 2020/0064408 A1 | 2/2020 | Sato | |
| 2020/0083722 A1 | 3/2020 | Zhang et al. | |
| 2020/0099111 A1 | 3/2020 | Numata et al. | |
| 2020/0142004 A1 | 5/2020 | Ito et al. | |
| 2020/0207219 A1 | 7/2020 | Slepchenkov et al. | |
| 2020/0274204 A1 | 8/2020 | Dawley | |
| 2020/0284844 A1 | 9/2020 | Kawamoto et al. | |
| 2020/0287185 A1* | 9/2020 | DeKeuster | H01M 10/0525 |
| 2020/0366112 A1 | 11/2020 | Koch et al. | |
| 2021/0362623 A1 | 11/2021 | Hori | |
| 2021/0410222 A1 | 12/2021 | Numata | |
| 2022/0077710 A1 | 3/2022 | Sung | |
| 2022/0187379 A1 | 6/2022 | Lee et al. | |
| 2022/0294041 A1 | 9/2022 | Yoshida et al. | |
| 2022/0311060 A1 | 9/2022 | Wang et al. | |
| 2023/0238670 A1* | 7/2023 | Jeon | H01M 50/519 |
| | | | 429/163 |

FOREIGN PATENT DOCUMENTS

| | | | | | |
|---|---|---|---|---|---|
| CN | 206348442 | U | 7/2017 | | |
| CN | 108550937 | A | 9/2018 | | |
| CN | 111108401 | A | 5/2020 | | |
| CN | 112103576 | A | 12/2020 | | |
| CN | 112201866 | A | 1/2021 | | |
| DE | 102011088440 | A1 * | 6/2013 | ......... | H01M 10/486 |
| EP | 2 600 443 | A2 | 6/2013 | | |
| EP | 2 642 574 | A1 | 9/2013 | | |
| EP | 3 536 541 | A1 | 9/2019 | | |
| EP | 03537562 | A1 | 9/2019 | | |
| EP | 03945657 | A1 | 2/2022 | | |
| JP | 2011-101573 | A | 5/2011 | | |
| JP | 2011-182550 | A | 9/2011 | | |
| JP | 2012-010562 | A | 1/2012 | | |
| JP | 2012-085491 | A | 4/2012 | | |
| JP | 2012-124141 | A | 6/2012 | | |
| JP | 2013-222671 | A | 10/2013 | | |
| JP | 2013-236492 | A | 11/2013 | | |
| JP | 2014-127386 | A | 7/2014 | | |
| JP | 2015-506069 | A | 2/2015 | | |
| JP | 5710013 | B2 | 4/2015 | | |
| JP | 2015-162275 | | 9/2015 | | |
| JP | 5808418 | B2 | 11/2015 | | |
| JP | 2016-157681 | A | 9/2016 | | |
| JP | 2018-073691 | A | 5/2018 | | |
| JP | 6463371 | B2 | 1/2019 | | |
| JP | 2019-028038 | A | 2/2019 | | |
| JP | 2019-221050 | A | 12/2019 | | |
| JP | 2020-501482 | A | 1/2020 | | |
| JP | 2020-027767 | A | 2/2020 | | |
| JP | 2020-078115 | A | 5/2020 | | |
| JP | 2020-145003 | A | 9/2020 | | |
| JP | 2021-019371 | A | 2/2021 | | |
| JP | 2022-139076 | A | 9/2022 | | |
| KR | 10-2020-0129046 | A | 11/2020 | | |
| KR | 10-2021-0007254 | A | 1/2021 | | |
| WO | WO 2013/051156 | A1 | 4/2013 | | |
| WO | WO 2013/051157 | A1 | 4/2013 | | |
| WO | WO 2019/023675 | A1 | 1/2019 | | |
| WO | WO 2020/162255 | A1 | 8/2020 | | |
| WO | WO 2020/184513 | A1 | 9/2020 | | |
| WO | WO 2021/049752 | A1 | 3/2021 | | |

* cited by examiner

82

590

500

L1 L1

81

T2

510

596

597

598

599

580

591

520

592

540

593

594

595

T1

570

571

T1

T3

550

560

T3

93

500A 93 510a

81

61

91

POWER STORAGE CELL

This nonprovisional application is based on Japanese Patent Application No. 2021-039304 filed on Mar. 11, 2021, with the Japan Patent Office, the entire contents of which are hereby incorporated by reference.

BACKGROUND OF THE INVENTION

Field of the Invention

The present technology relates to a power storage cell.

Description of the Background Art

Japanese Patent Laying-Open No. 2020-27767 is a prior art document that discloses a configuration of a battery monitoring device. The battery monitoring device described in Japanese Patent Laying-Open No. 2020-27767 includes a detection substrate mounted on a battery module. The detection substrate has: a detection circuit that detects state information of the battery module; a wireless circuit; and an antenna that wirelessly transmits the state information of the battery module.

In the battery monitoring device described in Japanese Patent Laying-Open No. 2020-27767, since the detection substrate is mounted on the battery module, an occupied space thereof becomes large. Further, a space for disposing a power supply to feed power to the detection substrate is required, with the result that the occupied space becomes large.

SUMMARY OF THE INVENTION

An object of the present technology is to provide a power storage cell including a detection unit that performs wireless communication while suppressing an occupied space from being large.

A power storage cell according to a first aspect of the present technology includes an exterior package, a main body portion, and a detection unit. The main body portion is disposed inside the exterior package. The detection unit detects a state of the power storage cell and performs wireless communication, at least portion of the detection unit being disposed inside the exterior package.

A power storage cell according to a second aspect of the present technology includes a main body portion, a current collecting portion, and a detection unit. The current collecting portion is connected to the main body portion. The detection unit is electrically connected to the current collecting portion and is fed with power, detects a state of the power storage cell, and performs wireless communication.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
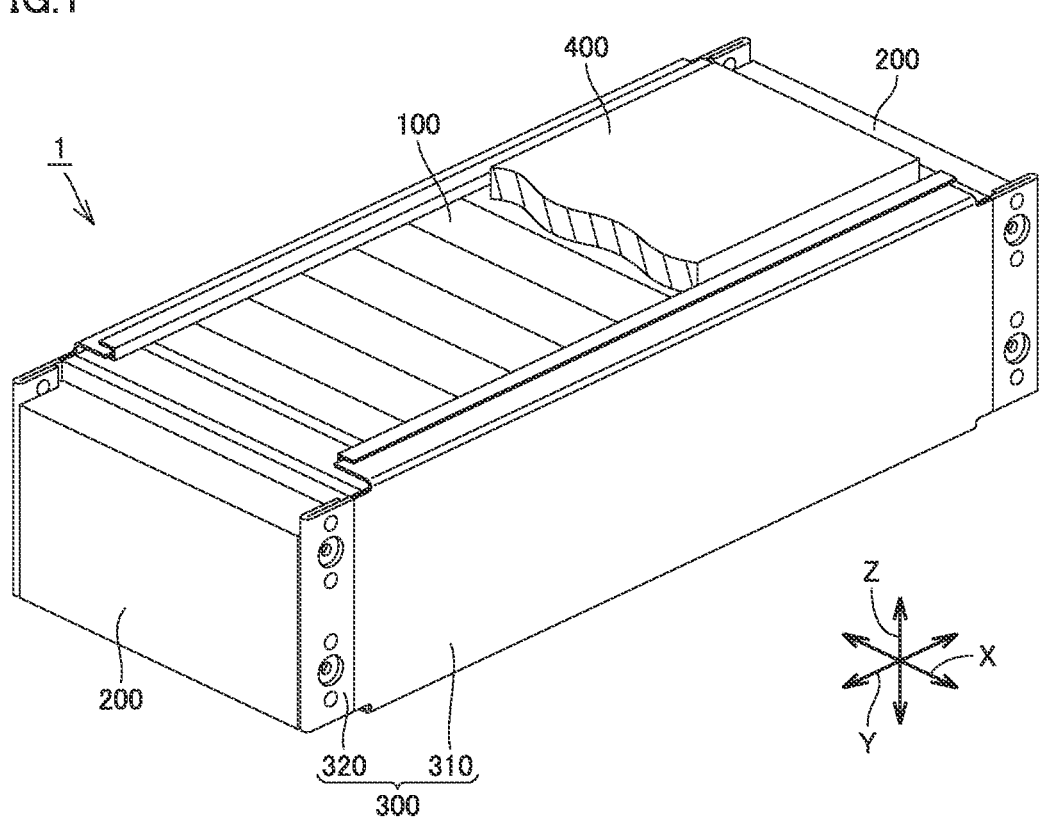
FIG. 1 is a diagram showing a basic configuration of a battery pack.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate. The term "current collecting portion" may collectively represent a positive electrode current collecting member and a negative electrode current collecting member.

In the present specification, the "power storage cell" or the "power storage module" is not limited to a battery cell or a battery module, and may include a capacitor cell or a capacitor module.

First Embodiment

Figure 2:
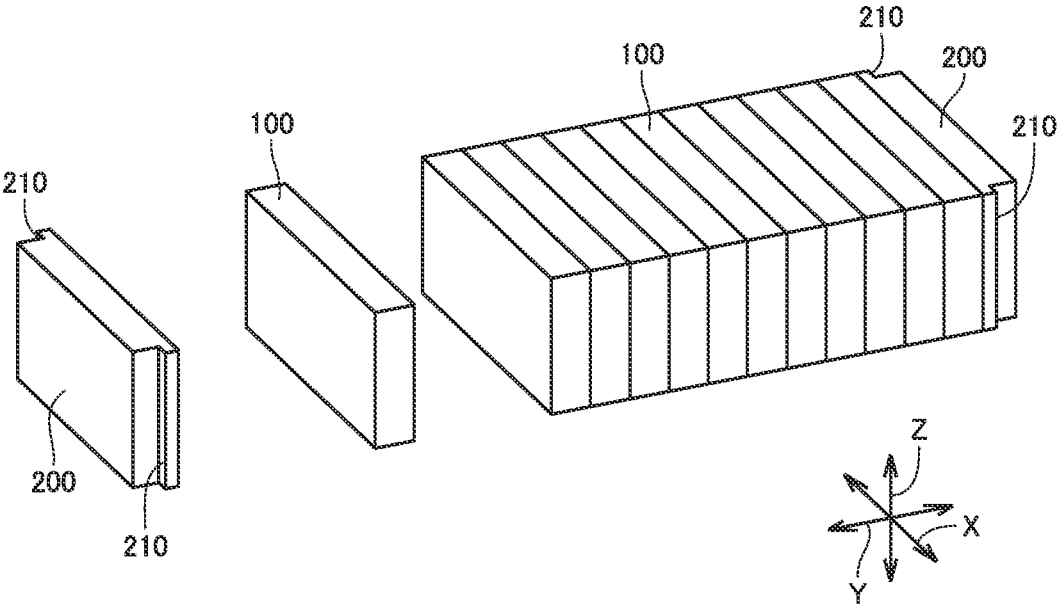
FIG. 2 is a diagram showing battery cells and end plates included in the battery pack.

FIG. 1 is a diagram showing a basic configuration of a battery pack 1. FIG. 2 is a diagram showing battery cells 100 and end plates 200 included in battery pack 1.

As shown in FIGS. 1 and 2, battery pack 1, which serves as an exemplary "power storage module", includes battery cells 100, end plates 200, a restraint member 300, and a resin plate 400.

The plurality of battery cells 100 are provided side by side in a Y axis direction (arrangement direction). Thus, a stack of battery cells 100 is formed. A separator (not shown) is interposed between the plurality of battery cells 100. The plurality of battery cells 100, which are sandwiched between two end plates 200, are pressed by end plates 200, and are therefore restrained between two end plates 200.

End plates 200 are disposed beside both ends of battery pack 1 in the Y axis direction. Each of end plates 200 is fixed to a base such as a case that accommodates battery pack 1. Stepped portions 210 are formed at both ends of end plate 200 in an X axis direction (width direction).

Restraint member 300 connects two end plates 200 to each other. Restraint member 300 is attached to stepped portions 210 formed on two end plates 200.

Restraint member 300 is engaged with end plates 200 with compression force in the Y axis direction being exerted to the stack of the plurality of battery cells 100 and end plates 200, and then the compression force is released, with the result that tensile force acts on restraint member 300 that connects two end plates 200 to each other. As a reaction thereto, restraint member 300 presses two end plates 200 in directions of bringing them closer to each other.

Restraint member 300 includes a first member 310 and a second member 320. First member 310 and second member 320 are coupled to each other by butt welding, for example. Tip surfaces formed by folding second member 320 are brought into abutment with stepped portions 210 of end plate 200 in the Y axis direction.

Figure 3:
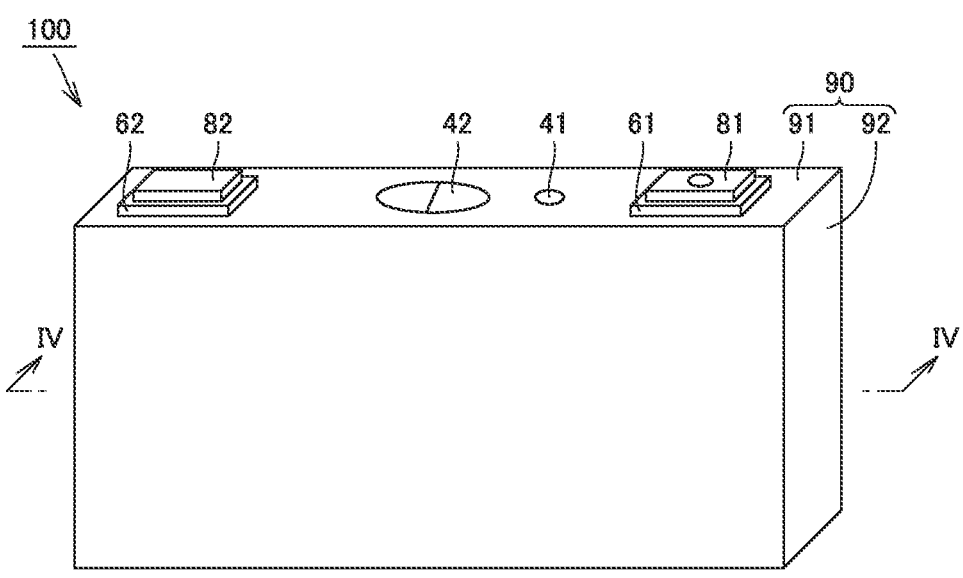
FIG. 3 is a diagram showing a battery cell in the battery pack.
Figure 4:
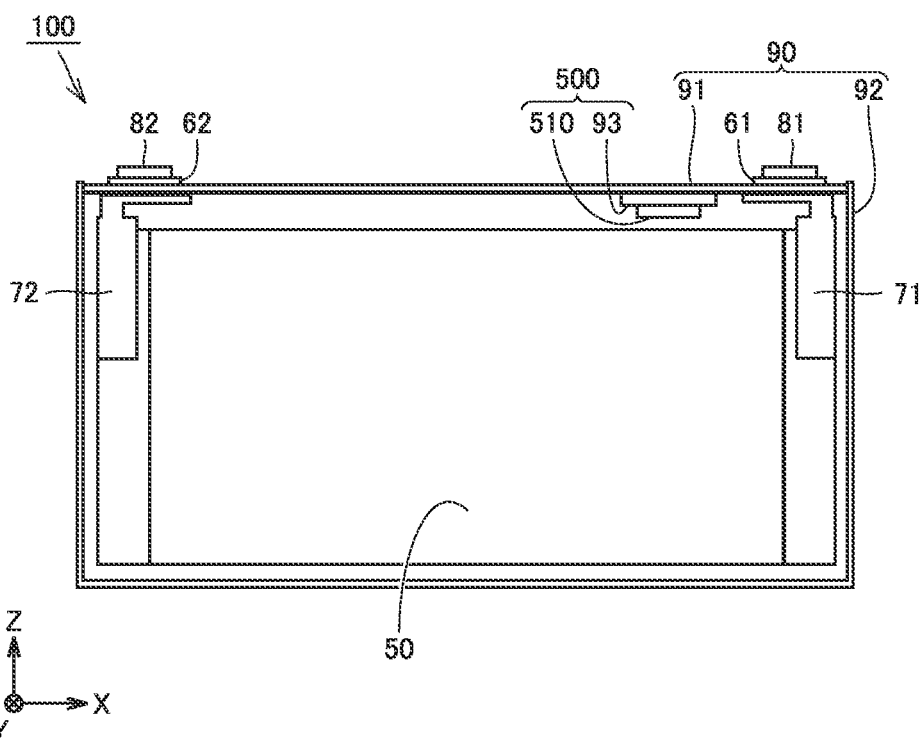
FIG. 4 is a cross sectional view when viewed in a direction of arrowed line IV-IV in FIG. 3.

FIG. 3 is a diagram showing battery cell 100 in battery pack 1. FIG. 4 is a cross sectional view when viewed in a direction of arrowed line IV-V in FIG. 3. As shown in FIGS. 3 and 4, battery cell 100 includes an exterior package 90, an electrode assembly 50, a positive electrode terminal 81, a negative electrode terminal 82, a positive electrode current collecting member 71, and a negative electrode current collecting member 72.

Exterior package 90 has a prismatic shape (shape of flat profile rectangular parallelepiped). It should be noted that the prismatic shape is exemplary. Exterior package 90 may have any shape. Exterior package 90 may have, for example, a cylindrical shape or a pouch shape. Exterior package 90 may be composed of, for example, an Al alloy. Exterior package 90 stores electrode assembly 50 and an electrolyte solution (not shown). Exterior package 90 may include, for example, a sealing plate 91 and an exterior container 92. Exterior container 92 is provided with an opening. Sealing plate 91 seals the opening of exterior container 92. For example, sealing plate 91 and exterior container 92 may be joined to each other by laser welding.

Positive electrode terminal 81 and negative electrode terminal 82 are provided on sealing plate 91. Positive electrode terminal 81 is fixed to sealing plate 91 with an insulating member 61 being interposed therebetween, insulating member 61 being composed of a resin. Negative electrode terminal 82 is fixed to sealing plate 91 with an insulating member 62 being interposed therebetween, insulating member 62 being composed of a resin.

Positive electrode terminal 81 is preferably composed of a metal, and is more preferably composed of aluminum or an aluminum alloy. Negative electrode terminal 82 is preferably composed of a metal, and is more preferably composed of copper or a copper alloy. Negative electrode terminal 82 may be configured to have: a region that is composed of copper or a copper alloy and that is disposed on the inner side of exterior package 90; and a region that is composed of aluminum or an aluminum alloy and that is disposed on the outer side of exterior package 90.

Sealing plate 91 may be further provided with an injection opening 41 and a gas discharge valve 42. The electrolyte solution can be injected from injection opening 41 to inside of exterior package 90. Gas discharge valve 42 is fractured when pressure inside exterior package 90 becomes more than or equal to a threshold value. Thus, a combustible gas in exterior package 90 is discharged to the outside of exterior package 90. A current collecting portion is connected to electrode assembly 50. Specifically, electrode assembly 50 is connected to positive electrode terminal 81 by positive electrode current collecting member 71. Positive electrode current collecting member 71 may be, for example, an Al plate or the like. Electrode assembly 50 is connected to negative electrode terminal 82 by negative electrode current collecting member 72. Negative electrode current collecting member 72 may be, for example, a Cu plate or the like.

Figure 5:
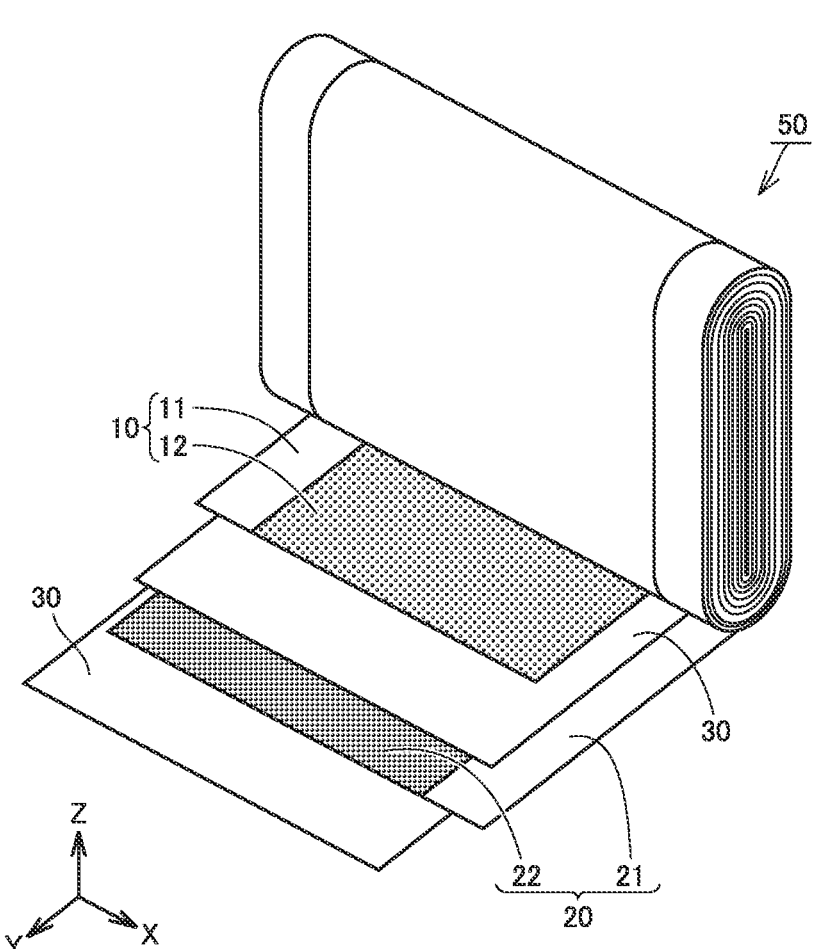
FIG. 5 is a schematic diagram showing an exemplary configuration of an electrode assembly in the present embodiment.

FIG. 5 is a schematic diagram showing an exemplary configuration of an electrode assembly in the present embodiment. Electrode assembly 50, which is a main body portion of battery cell 100, is disposed inside exterior package 90. Electrode assembly 50 is of winding type. Electrode assembly 50 includes a positive electrode 10, a separator 30, and a negative electrode 20. That is, battery cell 100 includes positive electrode 10, negative electrode 20, and the electrolyte solution. Each of positive electrode 10, separator 30, and negative electrode 20 is a sheet in the form of a strip. Electrode assembly 50 may include a plurality of separators 30. Electrode assembly 50 is formed by: layering positive electrode 10, separator 30, and negative electrode 20 in this order, and winding them in the form of a spiral. One of positive electrode 10 or negative electrode 20 may be interposed between separators 30. Both positive electrode 10 and negative electrode 20 may be interposed between separators 30. Electrode assembly 50 may be shaped to have a flat shape after the winding. It should be noted that the winding type is exemplary. Electrode assembly 50 may be, for example, of a stack type.

Positive electrode 10 includes a positive electrode substrate 11 and a positive electrode active material layer 12. Positive electrode substrate 11 is an electrically conductive sheet. Positive electrode substrate 11 may be, for example, an Al alloy foil or the like. Positive electrode substrate 11 may have a thickness of, for example, 10 µm to 30 µm. Positive electrode active material layer 12 is disposed on a surface of positive electrode substrate 11. Positive electrode active material layer 12 may be disposed only on one surface of positive electrode substrate 11, for example. Positive electrode active material layer 12 may be disposed on each of the front and rear surfaces of positive electrode substrate 11, for example. Positive electrode substrate 11 may be exposed at one end portion in the width direction of positive electrode 10 (X axis direction in FIG. 5). Positive electrode current collecting member 71 can be joined to the exposed portion of positive electrode substrate 11.

For example, an intermediate layer (not shown) may be formed between positive electrode active material layer 12 and positive electrode substrate 11. In the present embodiment, also when the intermediate layer is present, positive electrode active material layer 12 is regarded as being disposed on the surface of positive electrode substrate 11. The intermediate layer may be thinner than positive electrode active material layer 12. The intermediate layer may have a thickness of 0.1 μm to 10 μm, for example. The intermediate layer may include, for example, a conductive material, an insulating material, or the like.

Positive electrode active material layer 12 may have a thickness of, for example, 10 μm to 200 μm. Positive electrode active material layer 12 may have a thickness of, for example, 50 μm to 150 μm. Positive electrode active material layer 12 may have a thickness of, for example, 50 μm to 100 μm.

Positive electrode active material layer 12 includes a positive electrode active material. The positive electrode active material is a particle group. Positive electrode active material layer 12 may further include an additional component as long as the positive electrode active material is included. Positive electrode active material layer 12 may include, for example, a conductive material, a binder, or the like in addition to the positive electrode active material. The conductive material can include any component. For example, the conductive material may include at least one selected from a group consisting of carbon black, graphite, vapor-grown carbon fiber (VGCF), carbon nanotube (CNT), and graphene flake. A blending amount of the conductive material may be, for example, 0.1 part by mass to 10 parts by mass with respect to 100 parts by mass of the positive electrode active material. The binder can include any component. For example, the binder may include at least one selected from a group consisting of polyvinylidene difluoride (PVdF), poly(vinylidene fluoride-co-hexafluoropropylene) (PVdF-HFP), polytetrafluoroethylene (PTFE), and polyacrylic acid (PAA). A blending amount of the binder may be, for example, 0.1 part by mass to 10 parts by mass with respect to 100 parts by mass of the positive electrode active material.

Positive electrode active material layer 12 can have a high density. Positive electrode active material layer 12 may have a density of 3.6 $g/cm^3$ to 3.9 $g/cm^3$, for example. Positive electrode active material layer 12 may have a density of 3.65 $g/cm^3$ to 3.81 $g/cm^3$, for example. Positive electrode active material layer 12 may have a density of 3.70 $g/cm^3$ to 3.81 $g/cm^3$, for example. The density of the active material layer in the present specification represents an apparent density.

Negative electrode 20 may include a negative electrode substrate 21 and a negative electrode active material layer 22, for example. Negative electrode substrate 21 is an electrically conductive sheet. Negative electrode substrate 21 may be, for example, a Cu alloy foil or the like. Negative electrode substrate 21 may have a thickness of, for example, 5 μm to 30 μm. Negative electrode active material layer 22 may be disposed on a surface of negative electrode substrate 21. Negative electrode active material layer 22 may be disposed only on one surface of negative electrode substrate 21, for example. Negative electrode active material layer 22 may be disposed on each of the front and rear surfaces of negative electrode substrate 21, for example. Negative electrode substrate 21 may be exposed at one end portion in the width direction of negative electrode 20 (X axis direction in FIG. 5). Negative electrode current collecting member 72 can be joined to the exposed portion of negative electrode substrate 21.

Negative electrode active material layer 22 may have a thickness of, for example, 10 μm to 200 μm. Negative electrode active material layer 22 includes a negative electrode active material. The negative electrode active material may include any component. The negative electrode active material may include, for example, at least one selected from a group consisting of graphite, soft carbon, hard carbon, silicon, silicon oxide, a silicon-based alloy, tin, tin oxide, a tin-based alloy, and a lithium-titanium composite oxide.

Negative electrode active material layer 22 may further include, for example, a binder or the like in addition to the negative electrode active material. For example, negative electrode active material layer 22 may include: 95% to 99.5% of the negative electrode active material in mass fraction; and the remaining of the binder. The binder can include any component. The binder may include, for example, at least one selected from a group consisting of carboxymethyl cellulose (CMC) and styrene-butadiene rubber (SBR).

At least a portion of separator 30 is disposed between positive electrode 10 and negative electrode 20. Separator 30 separates positive electrode 10 and negative electrode 20 from each other. Separator 30 may have a thickness of, for example, 10 μm to 30 μm.

Separator 30 is a porous sheet. The electrolyte solution passes through separator 30. Separator 30 may have an air permeability of, for example, 200 s/100 mL to 400 s/100 mL. In the present specification, the "air permeability" represents "Air Resistance" defined in "JIS P 8117: 2009". The air permeability is measured by the Gurley test method.

Separator 30 is electrically insulative. Separator 30 may include, for example, a polyolefin-based resin or the like. Separator 30 may consist essentially of a polyolefin-based resin, for example. The polyolefin-based resin may include at least one selected from a group consisting of polyethylene (PE) and polypropylene (PP), for example. Separator 30 may have a single-layer structure, for example. Separator 30 may consist essentially of a PE layer, for example. Separator 30 may have a multilayer structure, for example. Separator 30 may be formed by layering a PP layer, a PE layer, and a PP layer in this order, for example. A heat-resistant layer or the like may be formed on the surface of separator 30, for example.

The electrolyte solution includes a solvent and a supporting electrolyte. The solvent is aprotic. The solvent can include any component. The solvent may include, for example, at least one selected from a group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. For example, the supporting electrolyte may include at least one selected from a group consisting of $LiPF_6$, $LiBF_4$, and $LiN(FSO_2)_2$. The supporting electrolyte may have a molar concentration of, for example, 0.5 mol/L to 2.0 mol/L. The supporting electrolyte may have a molar concentration of, for example, 0.8 mol/L to 1.2 mol/L.

The electrolyte solution may further include any additive in addition to the solvent and the supporting electrolyte. For example, the electrolyte solution may include 0.01% to 5% of the additive in mass fraction. The additive may include, for example, at least one selected from a group consisting of vinylene carbonate (VC), lithium difluorophosphate $(LiPO_2F_2)$, lithium fluorosulfonate $(FSO_3Li)$, and lithium bis[oxalatoborate] (LiBOB).

As shown in FIG. 4, battery cell 100 further includes a detection unit 500. At least a portion of detection unit 500 is disposed inside exterior package 90. Detection unit 500 includes a circuit board 93 and an antenna portion 510.

As shown in FIG. 4, circuit board 93 is located on the inner surface side of sealing plate 91. Specifically, circuit board 93 is attached to the inner surface of sealing plate 91. Circuit board 93 has a circuit that detects a state of battery cell 100. In circuit board 93, an integrated circuit and an electronic component both formed on a semiconductor such as Si are mounted on a printed board having an insulating function. In the present embodiment, an antenna pattern is formed on the printed board.

The state of battery cell 100 includes at least one of states of voltage, internal temperature, and internal pressure of battery cell 100. That is, detection unit 500 detects at least one of the states of the voltage of battery cell 100, the internal temperature of battery cell 100, and the internal pressure of battery cell 100.

Antenna portion 510 is provided on circuit board 93. Antenna portion 510 performs wireless communication. In the present embodiment, antenna portion 510 is disposed inside exterior package 90. Even when antenna portion 510 is disposed inside exterior package 90, antenna portion 510 can transmit and receive an electric wave through insulating members 61, 62 disposed in the surroundings of positive electrode terminal 81 and negative electrode terminal 82. Antenna portion 510 may transmit and receive an electromagnetic wave when performing short-range wireless communication that conforms to, for example, ISO/IEC18092, ISO/IEC14443, or the like. It should be noted that antenna portion 510 may be drawn out to the outside of exterior package 90 through injection opening 41 or another hole formed in the exterior package.

In the present embodiment, the short-range wireless communication employs Bluetooth to transmit a signal in a non-contact manner but is not limited to Bluetooth, and may employ communication in the NFC (Near Field Communication) standard. A communication device that conforms to the NFC standard is incorporated in a non-contact IC card such as a transportation card or an electronic money, or is incorporated in a small mobile device such as a mobile phone or a smartphone, and transmits a signal in the non-contact manner, for example.

Antenna portion 510 of each of the plurality of battery cells 100 included in battery pack 1 is configured to perform wireless communication with a wireless communication unit that is electrically connected to a battery management system (BMS), which is a monitoring unit disposed outside battery cell 100. The battery management system (BMS) includes a cell management controller (CMC) and a battery management controller (BMC). The battery management system (BMS) is installed in a battery system, a vehicle, or the like. It should be noted that the battery management system (BMS) transmits and receives various types of signals to and from a battery ECU (Electronic Control Unit) through communication that conforms to a CAN (Controller Area Network) protocol. Detection unit 500 may be connected to a cloud available through a network by bidirectional communication of antenna portion 510.

Figure 6:
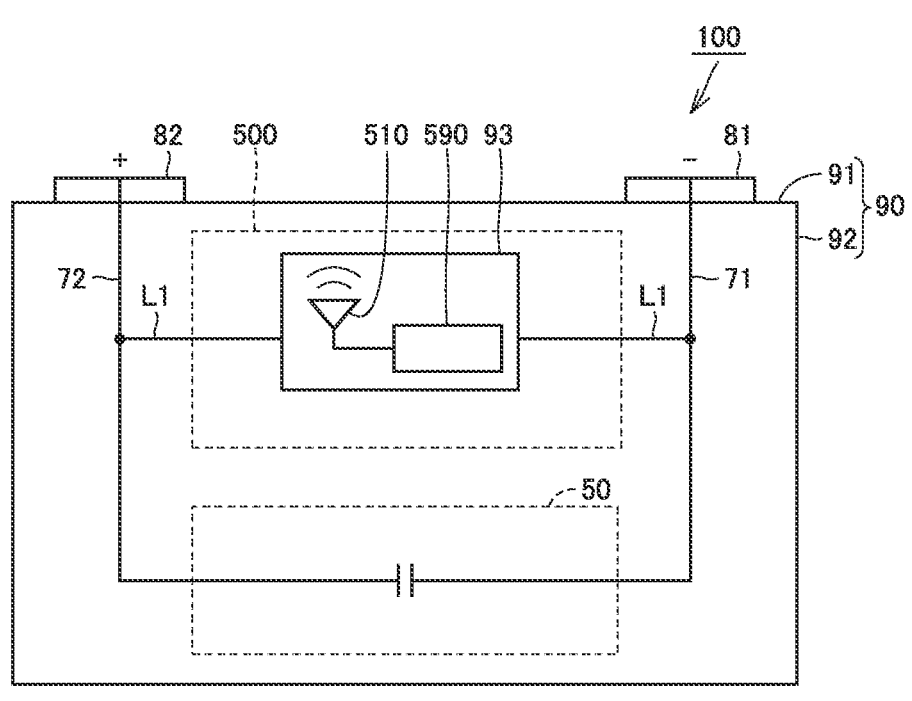
FIG. 6 is a circuit diagram showing electric connection between the battery cell and the detection unit.

FIG. 6 is a circuit diagram showing electric connection between the battery cell and the detection unit. As shown in FIG. 6, detection unit 500 is connected to a power feeding line L1.

Power feeding line L1 is connected to each of positive electrode current collecting member 71 and negative electrode current collecting member 72. However, power feeding line L1 may be connected to only one of positive electrode current collecting member 71 and negative electrode current collecting member 72. Thus, detection unit 500 is electrically connected to the current collecting portion and is fed with power.

Figures 7, 8:
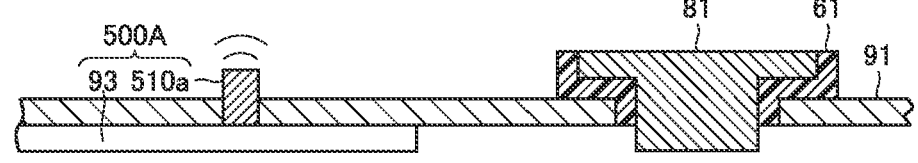
FIG. 7 is a functional block diagram showing a specific example of the detection unit.
FIG. 8 is a partial cross sectional view showing a periphery of an antenna portion of a battery cell according to a first modification of the first embodiment.

FIG. 7 is a functional block diagram showing a specific example of the detection unit. As shown in FIG. 7, detection unit 500 includes a microcomputer 590.

Microcomputer 590 is mounted on circuit board 93. Microcomputer 590 includes a power supply control unit 591, a CPU 520, a clock control unit 592, a voltage sensor 540, an analog/digital converter 593, a temperature sensor 594, a peripheral function unit 595, a wireless communication function unit 596, a program memory 597, a RAM (Random Access Memory) 598, a nonvolatile memory 599, and a program rewriting control unit 580.

Microcomputer 590 further includes two power supply terminals T1, an antenna terminal T2, and two sensor terminals T3. One power supply terminal T1 is electrically connected to positive electrode terminal 81 via power feeding line L1. Power feeding line L1 connected to positive electrode terminal 81 is provided with a fuse 571 to take a measure against overcurrent. The other power supply terminal T1 is electrically connected to negative electrode terminal 82 via power feeding line L1. In order to take measures against overvoltage and noise, a power supply input protection component 570 is connected between power feeding line L1 connected to positive electrode terminal 81 and power feeding line L1 connected to negative electrode terminal 82.

Antenna terminal T2 is connected to antenna portion 510. Antenna portion 510 is, for example, a pattern antenna formed on circuit board 93 to have a meandering shape. It should be noted that the shape and type of antenna portion 510 are appropriately set.

One sensor terminal T3 is connected to a pressure sensor 550. Pressure sensor 550 is disposed inside battery cell 100 to measure an internal pressure of battery cell 100. The other sensor terminal T3 is connected to a voltage sensor 560. Voltage sensor 560 is disposed inside battery cell 100 and is electrically connected to exterior container 92 to measure a potential of exterior container 92.

From power fed from battery cell 100, power supply control unit 591 generates power for operating microcomputer 590. Further, power supply control unit 591 controls an operation mode of microcomputer 590. Further, power supply control unit 591 can generate a reset signal.

CPU 520 performs various types of control and calculation. Clock control unit 592 generates an operation clock and a communication clock through internal oscillation, and controls the operation clock and the communication clock.

Voltage sensor 540 measures the voltage of battery cell 100 by detecting a potential difference between one power supply terminal T1 and the other power supply terminal T1 It should be noted that voltage sensor 540 converts a detected value of the potential difference, which is represented by an analog signal, into a parameter value of the voltage, which is represented by a digital signal, and outputs the parameter value.

Analog/digital converter 593 converts the detected value of the analog signal input from each of pressure sensor 550 and voltage sensor 560 into the parameter value that is represented by the digital signal, and outputs the parameter value.

Temperature sensor 594 is provided in microcomputer 590, and measures the internal temperature of battery cell 100. Peripheral function unit 595 performs a peripheral function of microcomputer 590 required for a program operation such as a timer.

Wireless communication function unit 596 has an RF (Radio Frequency) transceiver circuit that is capable of transmitting and receiving. Program memory 597, which serves as a storage unit, is a rewritable nonvolatile memory that stores a program for operating microcomputer 590. RAM 598 is a work memory for temporarily storing a program and data.

Nonvolatile memory 599 stores specific data, measurement history data, and the like for battery cell 100. Program rewriting control unit 580 performs, via wireless communication, rewriting or debugging of a program stored in program memory 597.

Microcomputer 590 can detect a state of battery cell 100 and can control a built-in function based on an instruction signal transmitted from the wireless communication unit electrically connected to the battery management system (BMS).

The state of battery cell 100 to be detected includes: the voltage of battery cell 100 detected by voltage sensor 540; the potential of exterior container 92 detected by voltage sensor 560; the internal temperature of battery cell 100 detected by temperature sensor 594; and the internal pressure of battery cell 100 detected by pressure sensor 550.

By microcomputer 590 performing various types of processing, the state information of battery cell 100 is subjected to A/D conversion and various types of signal processing, and is transmitted to the battery management system (BMS). Further, various types of measurement values and measurement histories are stored in nonvolatile memory 599.

It should be noted that when the detected voltages received from the plurality of battery cells 100 in battery pack 1 have variations, the battery management system (BMS) transmits an instruction signal for performing cell balancing to equalize the voltages of battery cells 100. Specifically, an instruction signal is transmitted to a battery cell 100 having a high voltage value so as to operate a microcomputer 590 of battery cell 100 or so as to cause microcomputer 590 of battery cell 100 to perform wireless communication. Since microcomputer 590 of battery cell 100 having received the instruction signal is operated or performs wireless communication to consume power, the voltages of the plurality of battery cells 100 in battery pack 1 are equalized. In the present embodiment, microcomputer 590 itself or wireless communication function unit 596 serves as a cell balancing unit that equalizes the voltage of each power storage cell.

In battery cell 100 according to the present embodiment, since detection unit 500 is disposed inside exterior package 90, the occupied space of battery cell 100 including detection unit 500 that performs wireless communication can be suppressed from being large.

In battery cell 100 according to the present embodiment, since detection unit 500 is electrically connected to the current collecting portion and is fed with power, it is not necessary to additionally dispose a power supply for feeding power to detection unit 500, with the result that the occupied space of battery cell 100 including detection unit 500 that performs wireless communication can be suppressed from being large.

By measuring the voltage of battery cell 100 by voltage sensor 540 connected between positive electrode current collecting member 71 and negative electrode current collecting member 72, the voltage of battery cell 100 can be measured with high precision as compared with the case where the voltage of battery cell 100 is measured via a bus bar that connects battery cells 100.

By measuring the internal pressure of battery cell 100 using pressure sensor 550 disposed inside battery cell 100, the internal pressure of battery cell 100 can be measured with high precision.

By measuring the internal temperature of battery cell 100 by temperature sensor 594 disposed inside battery cell 100, the temperature can be measured at a position close to electrode assembly 50 as compared with the conventional battery cell, with the result that the internal temperature of battery cell 100 can be measured with high precision. It should be noted that circuit board 94 may be subjected to insulating treatment by coating or potting with a resin With this insulating treatment, internal short circuit of battery cell 100 due to a metal piece or the like can be prevented.

Hereinafter, a modification of the battery cell according to the present embodiment will be described. In the following description of the modification, the same configuration as that of battery cell 100 according to the first embodiment will not be described repeatedly.

FIG. 8 is a partial cross sectional view showing a periphery of an antenna portion of a battery cell according to a first modification of the first embodiment. As shown in FIG. 8, in the battery cell according to the first modification of the first embodiment, an antenna portion 510a extends to the outside of exterior package 90 through sealing plate 91. It should be noted that an insulating sealing member (not shown) seals between antenna portion 510a and sealing plate 91.

According to the present modification, since only the tip of antenna portion 510a is disposed outside exterior package 90 while circuit board 93 is disposed inside exterior package 90, wireless communication characteristics of detection unit 500A can be improved while suppressing the occupied space of the battery cell from being large.

Figure 9:
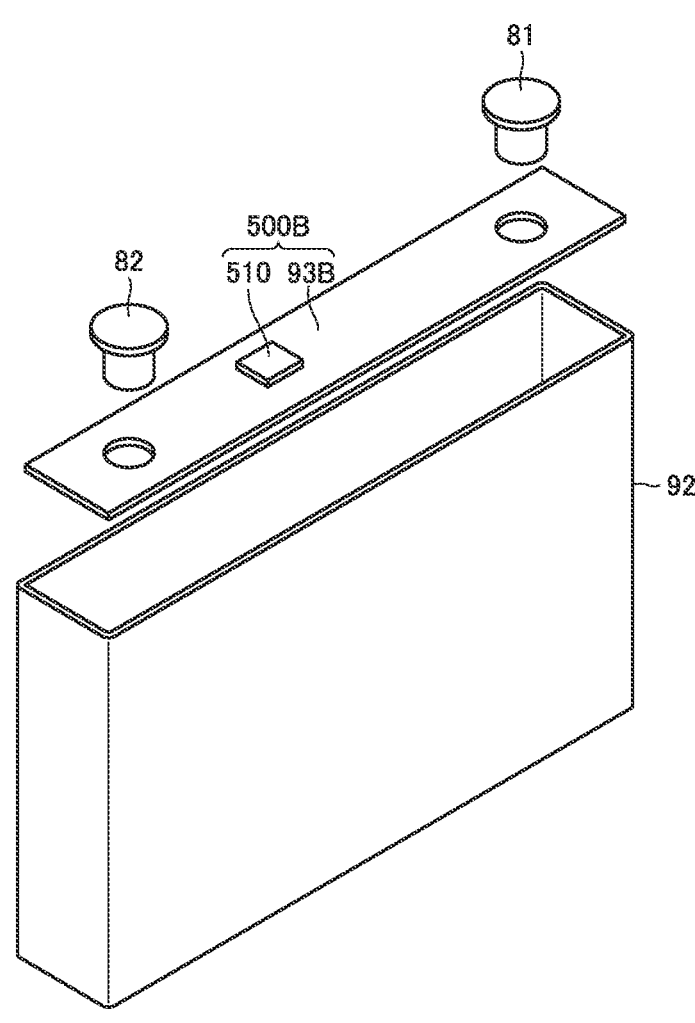
FIG. 9 is an exploded perspective view showing configurations of a detection unit and an exterior package of a battery cell according to a second modification of the first embodiment.
Figure 10:
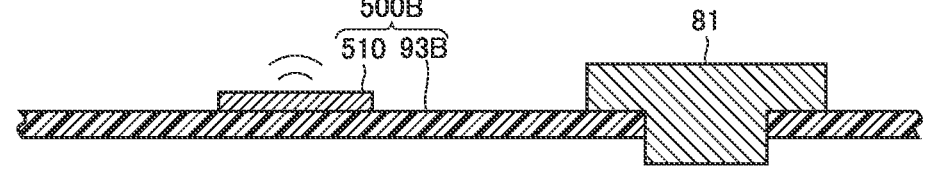
FIG. 10 is a partial cross sectional view showing the configuration of the detection unit of the battery cell according to the second modification of the first embodiment.

FIG. 9 is an exploded perspective view showing configurations of a detection unit and an exterior package of a battery cell according to a second modification of the first embodiment. FIG. 10 is a partial cross sectional view showing the configuration of the detection unit of the battery cell according to the second modification of the first embodiment.

As shown in FIGS. 9 and 10, in the battery cell according to the second modification of the first embodiment, a detection unit 500B includes: an insulating circuit board 93B having a circuit that detects a state of the battery cell; and an antenna portion 510 provided on insulating circuit board 93B. Insulating circuit board 93B seals the opening of exterior container 92. Antenna portion 510 is located outside the exterior package.

Insulating circuit board 93B is composed of, for example, an insulating resin such as a glass epoxy resin. In the present modification, each of positive electrode terminal 81 and negative electrode terminal 82 is directly fixed to the sealing plate constituted of insulating circuit board 93B. Insulating circuit board 93B and exterior container 92 are hermetically joined to each other by a joining material (not shown).

According to the present modification, since antenna portion 510 is disposed outside the exterior package with insulating circuit board 93B being disposed inside the exterior package, the wireless communication characteristics of detection unit 500B can be improved while suppressing the occupied space of the battery cell from being large. Further, since insulating members 61, 62 are not required, the number of components can be reduced.

Second Embodiment

Hereinafter, a battery cell according to a second embodiment will be described with reference to figures. Because the battery cell according to the second embodiment is different from battery cell 100 according to the first embodiment in that the exterior package is of the pouch type and the electrode assembly serving as the main body portion is of the stack type, the same configurations as those in battery cell 100 according to the first embodiment will not be described repeatedly.

Figure 11:
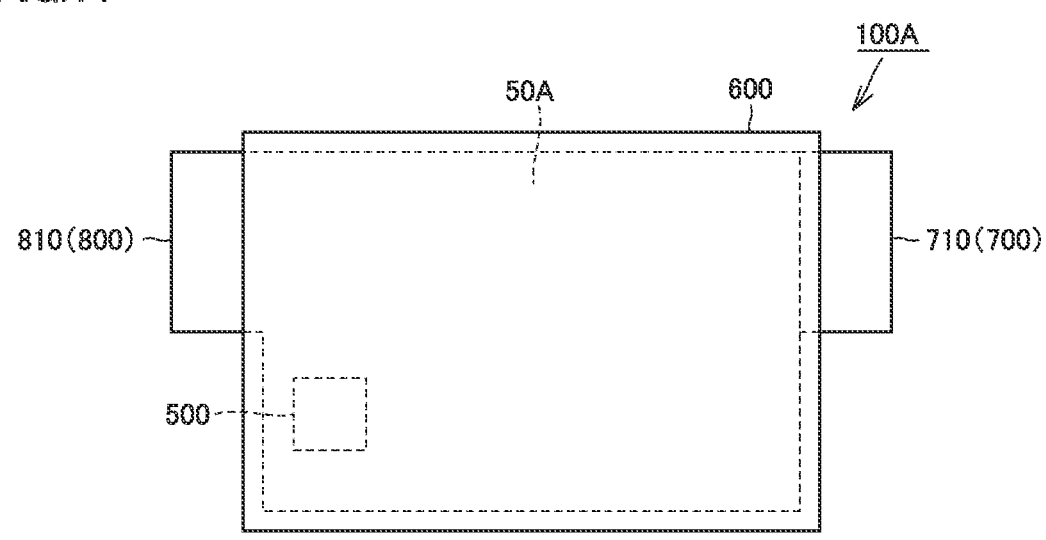
FIG. 11 is a plan view showing an external appearance of a battery cell according to a second embodiment.
Figure 12:
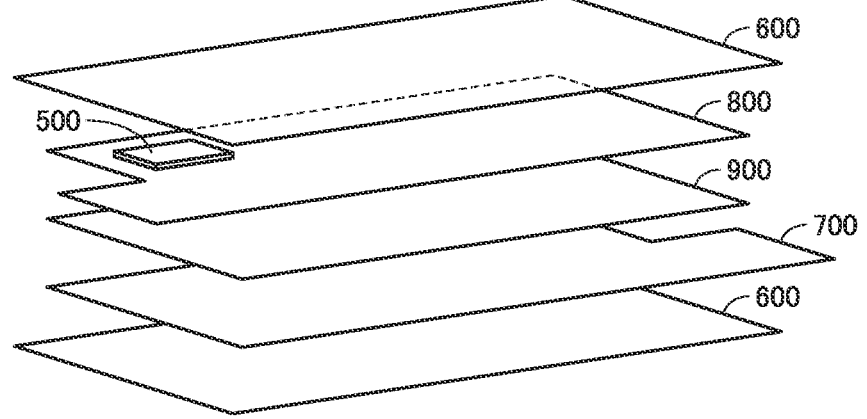
FIG. 12 is an exploded perspective view showing a configuration of the battery cell according to the second embodiment.

FIG. 11 is a plan view showing an external appearance of the battery cell according to the second embodiment. FIG. 12 is an exploded perspective view showing a configuration of the battery cell according to the second embodiment. As shown in FIGS. 11 and 12, a battery cell 100A according to the second embodiment includes an exterior package 600, an electrode assembly 50A, and detection unit 500.

Exterior package 600 is constituted of two shrink films adhered to each other. Each of the shrink films is, for example, an aluminum laminate film in which an aluminum foil and a resin film are layered. Electrode assembly 50A is disposed inside exterior package 600. An electrolyte solution (not shown) is provided inside exterior package 600.

Electrode assembly 50A is constructed by layering a positive electrode 700, a separator 900, and a negative electrode 800 in this order. Each of a positive electrode current collecting portion 710, which is a portion of positive electrode 700, and a negative electrode current collecting portion 810, which is a portion of negative electrode 800, is drawn out to the outside of exterior package 600.

At least a portion of separator 900 is interposed between positive electrode 700 and negative electrode 800. Separator 900 separates positive electrode 700 and negative electrode 800 from each other. Separator 900 is a porous sheet. The electrolyte solution passes through separator 900. Separator 900 is electrically insulative.

Detection unit 500 is disposed on negative electrode 800 inside exterior package 600. Detection unit 500 is electrically connected to negative electrode 800 and is fed with power. For wireless communication of the antenna portion, an opening may be provided in the aluminum foil located at a portion of exterior package 600 covering the antenna portion, or only the tip of the antenna portion may be located outside exterior package 600. It should be noted that the antenna portion may be drawn out to the outside of exterior package 600 through a hole formed in exterior package 600.

In battery cell 100A according to the present embodiment, since detection unit 500 is disposed inside exterior package 600, the occupied space of battery cell 100A including detection unit 500 that performs wireless communication can be suppressed from being large. Further, since exterior package 600 of the pouch type is smaller than the exterior package having the exterior container, the occupied space of battery cell 100A can be effectively suppressed from being large.

Hereinafter, a modification of the battery cell according to the present embodiment will be described. In the following description of the modification, the same configurations as those in battery cell 100A according to the second embodiment will not be described repeatedly.

Figure 13:
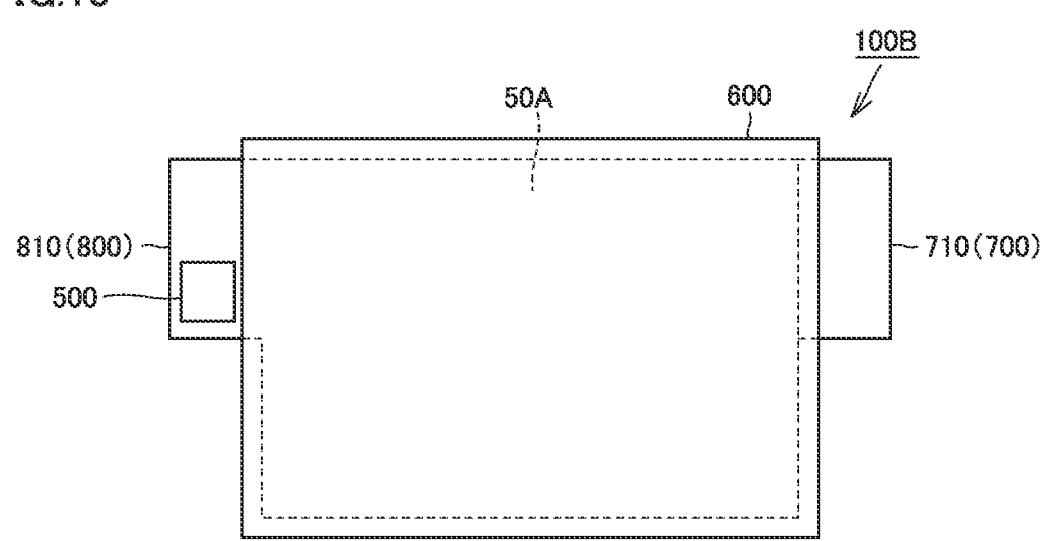
FIG. 13 is a plan view showing an external appearance of a battery cell according to a modification of the second embodiment.

FIG. 13 is a plan view showing an external appearance of the battery cell according to the modification of the second embodiment. As shown in FIG. 13, detection unit 500 of a battery cell 100B according to the modification of the second embodiment is disposed on negative electrode current collecting portion 810. Detection unit 500 is electrically connected to negative electrode current collecting portion 810 and is fed with power.

In battery cell 100B according to the present modification, since detection unit 500 is electrically connected to the current collecting portion and is fed with power, it is not necessary to additionally dispose a power supply for feeding power to detection unit 500, with the result that the occupied space of battery cell 100B including detection unit 500 that performs wireless communication can be suppressed from being large. Since the antenna portion is disposed outside exterior package 600, the wireless communication characteristics of detection unit 500 can be improved.

Although the embodiments of the present invention have been described and illustrated in detail, it is clearly understood that the same is by way of illustration and example only and is not to be taken by way of limitation, the scope of the present invention being interpreted by the terms of the appended claims

What is claimed is:

1. A power storage module comprising:
a plurality of power storage cells;
each of the plurality of power storage cells comprising:
an exterior package encompassing only an individual power storage cell of the plurality of power storage cells;
a main body portion disposed inside the exterior package; and
a detection unit that detects a state of the individual power storage cell and that performs wireless communication, at least a portion of the detection unit being disposed inside the exterior package,
wherein the detection unit includes a microcomputer and a wireless communication function unit which serves as a cell balancing unit that performs wireless communication to consume power from the power storage cell when the detection unit determines that a voltage value of the power storage cell is higher than a voltage value of other power storage cells of the plurality of power storage cells, thereby equalizing voltages of the plurality of power storage cells in the power storage module,
the detection unit includes a substrate having a circuit that detects the state of the power storage cell encompassed within the exterior package, and an antenna portion provided on the substrate,
the exterior package includes an exterior container containing only the individual power storage cell of the plurality of power storage cells in the power storage module, the exterior container being provided with an opening, and a sealing plate that seals the opening of the exterior container,
the substrate is located on an inner surface side of the sealing plate, and
the antenna portion extends to outside of the exterior package through the sealing plate or the exterior package.

2. The power storage module according to claim 1, each of the plurality of power storage cells further comprising a current collecting portion connected to the main body portion,
the detection unit is electrically connected to the current collecting portion and is fed with power.

3. The power storage module according to claim 1, wherein the detection unit detects at least one of states of:
a voltage of the power storage cell;
an internal temperature of the power storage cell; and
an internal pressure of the power storage cell.

4. The power storage module according to claim 3, wherein
the detection unit includes a storage unit, and
the storage unit stores data resulting from detecting the state of the power storage cell.

5. The power storage module according to claim 3, wherein the microcomputer includes power supply terminals, an antenna terminal and a sensor terminal.

6. A power storage module comprising:

a plurality of power storage cells;

each of the plurality of power storage cells comprising:

a main body portion;

a current collecting portion connected to the main body portion; and a detection unit that is electrically connected to the current collecting portion and is fed with power, that detects a state of the power storage cell, and that performs wireless communication, wherein the detection unit includes a microcomputer and a wireless communication function unit which serves as a cell balancing unit that performs wireless communication to consume power from the power storage cell when the detection unit determines that a voltage value of the power storage cell is higher than a voltage value of other power storage cells of the plurality of power storage cells, thereby equalizing voltages of the plurality of power storage cells in the power storage module.

7. The power storage module according to claim 6, wherein the detection unit detects at least one of states of:

a voltage of the power storage cell;

an internal temperature of the power storage cell; and an internal pressure of the power storage cell.

8. The power storage module according to claim 7, wherein the detection unit includes a storage unit, and the storage unit stores data resulting from detecting the state of the power storage cell.

9. The power storage module according to claim 7, wherein the microcomputer includes power supply terminals, an antenna terminal and a sensor terminal.

\*    \*    \*    \*    \*